(12) United States Patent
Martin et al.

(10) Patent No.: US 7,120,143 B1
(45) Date of Patent: Oct. 10, 2006

(54) VOICE-OVER INTERNET PROTOCOL PROCESSOR

(75) Inventors: Bryan R. Martin, Campbell, CA (US);
Ian John Buckley, Los Altos, CA (US);
Philip Bednarz, Menlo Park, CA (US);
Douglas A. Chrissan, Cupertino, CA (US)

(73) Assignee: 8x8, Inc., Santa Clara, CA (US)

( * ) Notice: Subject to any disclaimer, the term of this patent is extended or adjusted under 35 U.S.C. 154(b) by 568 days.

(21) Appl. No.: 09/662,077

(22) Filed: Sep. 14, 2000

Related U.S. Application Data

(60) Provisional application No. 60/154,093, filed on Sep. 15, 1999.

(51) Int. Cl.
*H04L 12/66* (2006.01)
*H04J 3/16* (2006.01)

(52) U.S. Cl. .................. 370/356; 370/463; 370/466

(58) Field of Classification Search ............... 370/401, 370/352, 356, 463, 465, 466, 521; 379/222.11, 379/357, 900, 88.17, 357.01; 709/233; 364/736, 364/236; 703/13; 455/556, 556.1
See application file for complete search history.

(56) References Cited

U.S. PATENT DOCUMENTS

| | | | | |
|---|---|---|---|---|
| 4,248,200 A | * | 2/1981 | Sugiura et al. ............. 123/644 |
| 4,608,462 A | * | 8/1986 | Blomley et al. ........ 379/395.01 |
| 5,303,326 A | * | 4/1994 | Dean et al. ................ 704/201 |
| 5,400,394 A | * | 3/1995 | Raman et al. ........... 379/88.07 |
| 5,513,374 A | * | 4/1996 | Baji ........................... 710/26 |
| 5,553,276 A | * | 9/1996 | Dean ......................... 713/500 |
| 5,598,362 A | * | 1/1997 | Adelman et al. ........... 708/603 |
| 5,694,093 A | * | 12/1997 | DaSilva et al. ............. 332/103 |
| 5,799,068 A | * | 8/1998 | Kikinis et al. ............ 379/93.06 |
| 5,884,074 A | * | 3/1999 | Maeda et al. ................. 713/2 |
| 6,044,455 A | * | 3/2000 | Hara .......................... 712/213 |
| 6,097,243 A | * | 8/2000 | Bertin et al. ................ 327/544 |
| 6,119,179 A | * | 9/2000 | Whitridge et al. ............ 710/72 |
| 6,218,706 B1 | * | 4/2001 | Waggoner et al. .......... 257/355 |
| 6,272,451 B1 | * | 8/2001 | Mason et al. ................ 703/13 |
| 6,353,863 B1 | * | 3/2002 | Nakagawa et al. ............ 710/5 |
| 6,373,835 B1 | * | 4/2002 | Ng et al. .................... 370/352 |

(Continued)

Primary Examiner—Chau Nguyen
Assistant Examiner—Ian N. Moore
(74) Attorney, Agent, or Firm—Crawford Maunu PLLC; Robert J. Crawford

(57) ABSTRACT

The present invention is directed to audio processing including IP telephony audio processing. Voice-over-IP terminals used in phone terminal applications benefit from a low-power implementation suitable for the limited chassis area of these devices. According to an example embodiment of the present invention, a programmable audio processor chip is adapted to process voice data for IP communications. The chip includes a DSP voice compression device adapted to compress voice data, and audio processing circuitry programmed with an audio processing software application adapted to process the compressed voice data. The chip further includes an IP network stack adapted to store and process IP data. The IP data includes protocols for processing the compressed voice data via an IP network. A communication stack is also included in the chip and is adapted to store and process communications data. The communications data includes audio processing protocols for processing the compressed voice data. In a more particular example implementation, the chip is used in a complete IP phone system for processing data ranging from audio samples to compressed TCP/IP packetized network signals, and is implemented with 2 Mbits of on-chip RAM. In this manner, voice and data networks are effectively fused in a way that facilitates user control for the integration of applications including computer telephony applications.

27 Claims, 6 Drawing Sheets

U.S. PATENT DOCUMENTS

| | | | |
|---|---|---|---|
| 6,449,269 B1 * | 9/2002 | Edholm | 370/352 |
| 6,456,138 B1 * | 9/2002 | Yoder et al. | 327/293 |
| 6,515,996 B1 * | 2/2003 | Tonnby et al. | 370/401 |
| 6,658,020 B1 * | 12/2003 | Isaka et al. | 370/466 |
| 2003/0197063 A1 * | 10/2003 | Longacre | 235/462.08 |
| 2003/0219128 A1 * | 11/2003 | Luby | 380/255 |

* cited by examiner

PIPELINE: IF RF EXE MEM WB
IF: INSTRUCTION FETCH, RF: REGISTER FETCH, EXE: EXECUTE, MEM: MEMORY ACCESS, WB: WRITE BACK

FIG. 7

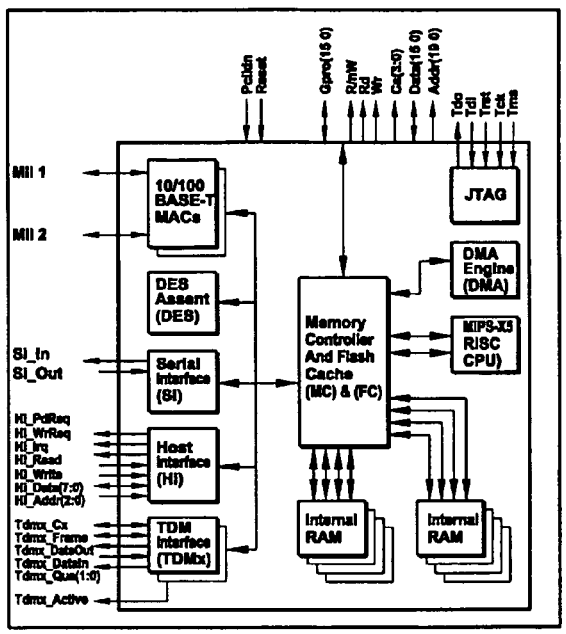

- MIPS-X5 Combined RISC and DSP core (200+ DSP MIPS).
- 256KBytes on chip RAM, 8 way interleaved, with single cycle access. 64 Bytes of boot ROM.
- Two 10/100 Base - T Ethernet MACs with MII Interface.
- 8 KByte, 2 way set associative cache for external flash program memory.
- Glueless support of SLIC/SLAC codecs and character LCD displays via TDM & GPIO ports.
- GCC based compiler support with assembler and debugger.
- Low power. 1.8V +/- 10% core voltage, 3.3V +/- 10% I/O voltage.
- 176 TQFP package/JTAG.

FIG. 8

- Software Development Tools
    - Dynamic linker, boot mechanism, compiler test suite, gdb/debug
- POSIX Operating System
    - Interrupt vector, context switching method, scheduling, semaphores, CLIB/printf
- Device Drivers
    - MAC, TDM, Host, UART
- Audio Libraries
    - G.711, G.723, G.729A, G.729E, Acoustic Echo Cancellation
- Managers
    - Audio, MAC/Network
- Applications
    - Audio loopback
    - MGCP/H3.23 loopback

- *Implementation of the POSIX operating system*
- *Full support for:*
    - *Threads (single process, multiple threads)*
    - *Scheduling (two algorithms – FIFO and round robin)*
    - *Semaphores*
    - *Mutexes*
    - *Condition Variables*
    - *Message Queues*
    - *Signal and Timers*

VOICE-OVER INTERNET PROTOCOL PROCESSOR

RELATED PATENT DOCUMENTS

This application claims priority to and is a conversion of U.S. Provisional Application Ser. No. 60/154,093, filed on Sep. 15, 1999 (8X8S.243P1), entitled "200 MHZ 0.25 W Packet Audio Terminal Processor for Voice-Over-Internet Protocol Applications". This patent document is related to U.S. patent application Ser. No. 09/005,053, entitled "Videocommunicating Apparatus and Method Therefor", filed on Jan. 1, 1998 (now U.S. Pat. No. 6,124,882), which is a continuation-in-part of U.S. patent application Ser. No. 08/908,826, filed on Aug. 8, 1997 (now U.S. Pat. No. 5,790,712), which is a continuation of U.S. patent application Ser. No. 08/658,917, filed on May 31, 1996 (now abandoned), which is a continuation of U.S. patent application Ser. No. 08/303,973, filed Sep. 9, 1994 (now abandoned), which is a continuation of U.S. patent application Ser. No. 07/838,382, filed on Feb. 19, 1992, (now U.S. Pat. No. 5,379,351), which are hereby fully incorporated by reference. This patent document is also related to U.S. patent application Ser. No. 07/838,380, entitled "Programmable Architecture and Methods For Motion Estimation", filed on Feb. 19, 1992 (now U.S. Pat. No. 5,594,813), which is hereby fully incorporated by reference.

FIELD OF THE INVENTION

The present invention relates to communication systems, and more particularly, to Internet protocol (IP) audio processing.

BACKGROUND OF THE INVENTION

The electronics industry continues to rely upon advances in technology to realize higher-functioning devices at cost-effective prices. For many communication applications, realizing higher-functioning devices in a cost-effective manner requires the creative use of communications channels. Many technologies have been developed that have enhanced communications. Examples include the Internet, facsimile applications, public switched telephone networks (PSTN), wireless telephones, voicemail systems, email systems, paging systems, conferencing systems, electronic calendars and appointment books, electronic address books, and video-image processing systems that communicate video data simultaneously with voice data over a telephones and the Internet. As the popularity of these technologies increases, so does the need to merge and coordinate these technologies in a manner that is convenient and cost-effective for the user.

The growing availability and applicability of the Internet has spawned a growth in the use of communication systems and services offering Internet protocol (IP) telephony. However, widespread acceptance and usage of such communication systems and services are largely a function of cost and user convenience. Therefore, for these technologies to continue to grow, they must be readily available and easy to use.

One challenge to the development and improvement of IP telephony devices is the need for low-power, low-cost, compact devices for providing such communications. Telephones, computers, and other communications devices are more portable and user-friendly when they are small, lightweight, and have low power consumption. In addition, typical telephony communication devices are being used for more and more applications, such as for voicemail, email, and Internet connections. As the amount of telephony and other communications data increases, processing the data becomes more complex.

Many common IP telephony devices typically utilize a multiple-chip combination of microcontroller and DSP functions to implement software application layers, TCP/IP network stack, communication stacks, and DSP voice compression functions required by the VoIP telephony device. The application, network, and communication software is usually implemented on the microcontroller and the voice compression (including codecs, acoustic echo cancellation, DTMF detection, FAX/modem relay, etc.) is implemented on one or more DSPs, usually in software coded in assembly language. These separate components can add to the complexity, size and power consumption of such devices.

For both unsophisticated and sophisticated users of such communication systems and services, the coordination of various communications methods and systems would be beneficial. In addition, it is important to provide scalable, cost-effective, user-friendly control over the communications networks and over the devices that interface with and configure the networks.

SUMMARY OF THE INVENTION

The present invention is directed processing voice data over an Internet protocol (IP) network. The present invention is exemplified in a number of implementations and applications, some of which are summarized below.

An example embodiment of the present invention advances the state of the art by integrating several functions into a single chip that implements programmable controller and compression applications in software architecture with standard C programmability. The device exhibits low-power consumption and a compact physical size realized by integrating sufficient memory on the chip to implement functions required by a thin-client, connection-less IP telephony device.

According to one particular example embodiment of the present invention, a programmable audio processor chip for processing voice data is adapted to process voice data using IP communications using low power and maintaining a compact configuration. The chip includes a voice compression device, audio processing circuitry, an IP network stack and a communication stack. The circuitry is programmed with an audio processing software application for processing compressed voice data. The communication stack is adapted to store and process communications data including protocol data for communicating the voice data. The chip processes the voice data using the IP stack to communicate via an IP network.

In another example embodiment of the present invention, a telephony communications device is adapted to communicate data including voice data using an audio processor chip such as the one described hereinabove. The telephony communications device includes a programmable audio processor chip (or chip set) having both microcontroller and DSP functions and is adapted to perform Internet protocol/digital (IP/D) conversions for IP voice data and digital voice data. An audio capture device is communicatively linked to the programmable audio processor chip and adapted to capture voice data and to communicate the captured voice data to the programmable audio processor chip. The telephony communications device further includes an audio speaker communicatively linked to the programmable audio processor chip and adapted to generate sound in response to data communicated from the programmable audio processor chip.

The above summary of the present invention is not intended to describe each illustrated embodiment or every implementation of the present invention. The figures and detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 7 shows an architectural summary of the Terminal Processor Chip, according to another example embodiment of the present invention;

FIG. 8 shows a list of Terminal Processor software that has been co-developed with the chip, and simulated in cycle-accurate C-models prior to chip tapeout, according to another example embodiment of the present invention;

Figure 1:
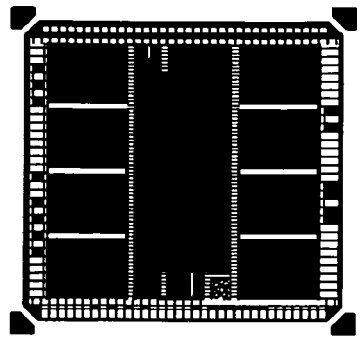
FIG. 1 shows a micrograph of the chip that contains 14.5 M transistors in a 6.35×6.35 mm$^2$ die, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to various types of communications devices and systems, and has been found particularly suited to applications requiring or benefiting from low-power, compact IP audio processors. While the present invention is not necessarily limited to such applications, various aspects of the invention may be appreciated through a discussion of various examples using this context.

According to an example embodiment of the present invention, a programmable audio processor chip or chip set having both microcontroller and DSP functions is adapted to perform Internet protocol/digital (IP/D) conversions for IP voice data and digital voice data. The chip can be used in a variety of communications applications, such as telephony applications involving traditional, wireless, IP, and digital data transmissions, and is particularly suited to be used in applications benefiting from a low-power integrated solution suitable for the limited chassis area of these devices.

Figure 2:
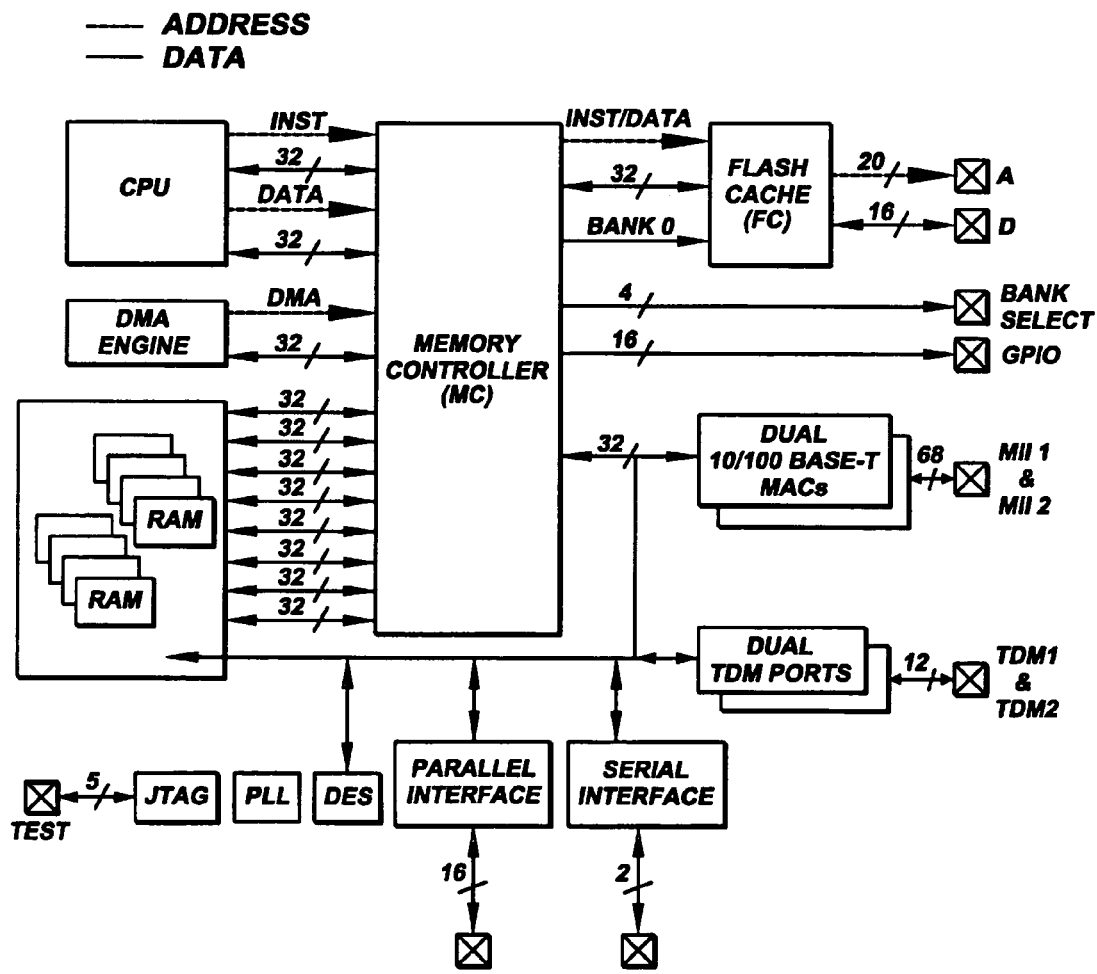
FIG. 2 shows a chip block diagram, according to another example embodiment of the present invention.

In a more particular example embodiment of the present invention, the chip includes a 200 MHz VoIP terminal processor implemented in a 0.18 μm 5-metal-layer CMOS process with 2 Mbits of SRAM. FIG. 1 shows a micrograph of the chip that contains 14.5M transistors in a 6.35×6.35 mm$^2$ die. This chip implements a complete VoIP terminal solution from raw digitized handset audio samples to compressed TCP/IP packetized Media Independent Interface (MII) signals. FIG. 2 is a processor block diagram for the chip of FIG. 1. The chip integrates a RISC processor (CPU), Memory Controller (MC), 8 kB FlashCache (FC) memory, DMA Engine, dual 10/100 Base-T Media Access Controllers (MACs), dual Time-Division-Multiplexer I/O (TDM) circuits, a Data Encryption Standard (DES) accelerator, Serial Interface (SI), parallel Host Interface (HI), 2 Mbits of SRAM, Phase Locked Loop (PLL), and a JTAG circuit. The external interfaces provide glueless connections to Ethernet physical layer ICs (PHYs), audio A/D and D/A circuits, Flash boot ROMs, general purpose memory-mapped and General Purpose I/O (GPIO) devices, and serial and parallel RISC access ports.

Figure 3:
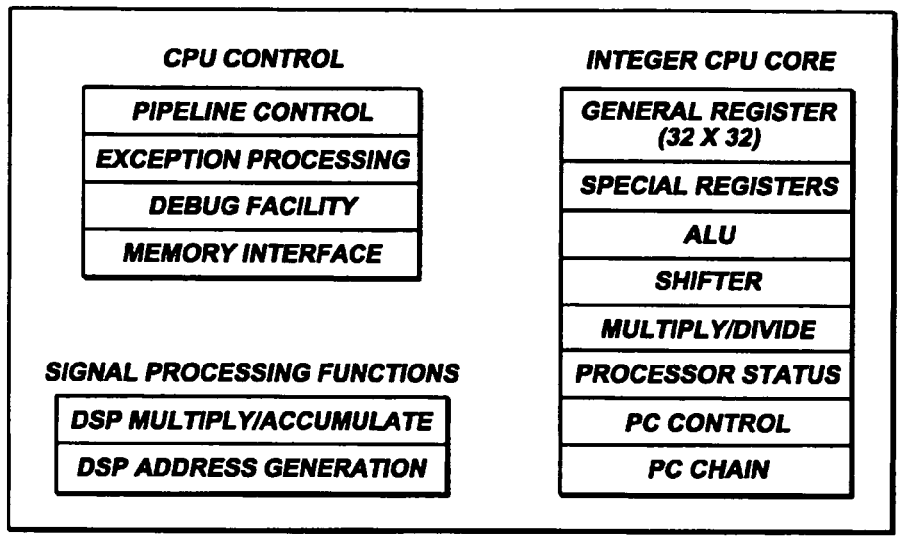
FIG. 3 illustrates CPU components and pipeline, according to another example embodiment of the present invention.
Figure 4:
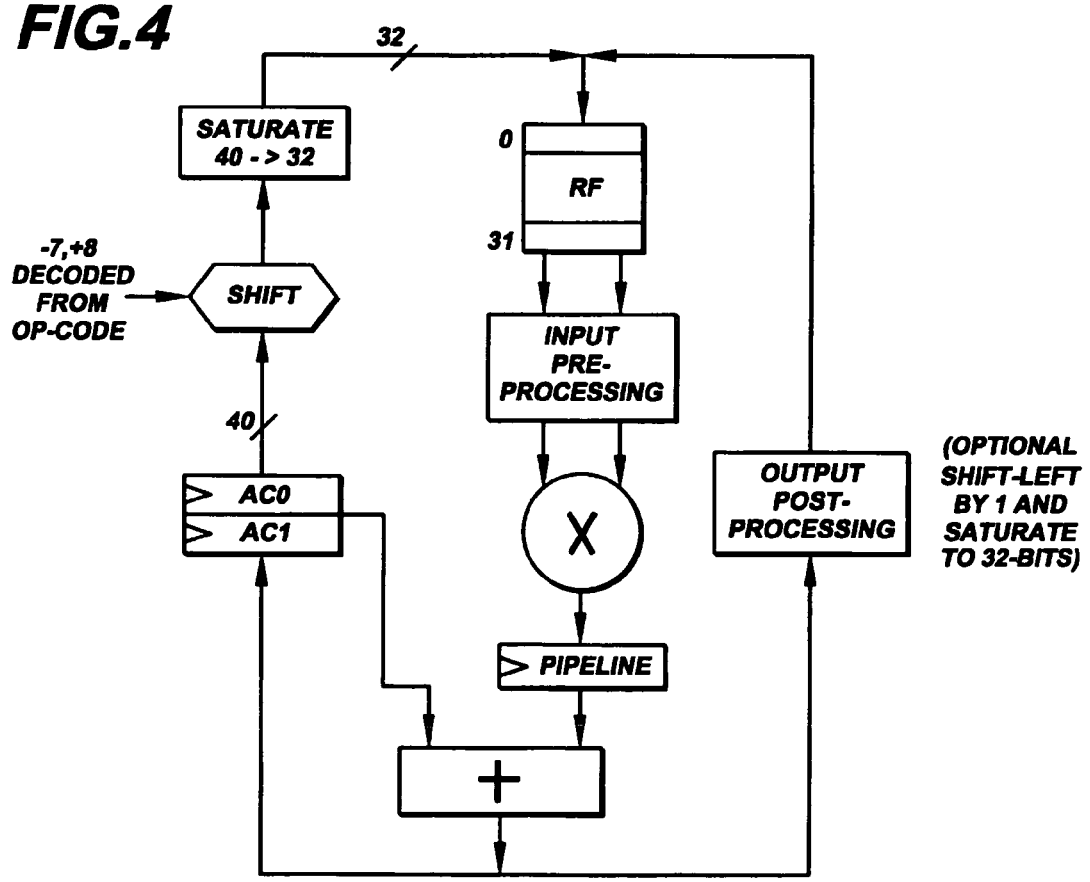
FIG. 4 shows a DSPMAC unit, according to another example embodiment of the present invention.
Figure 5:
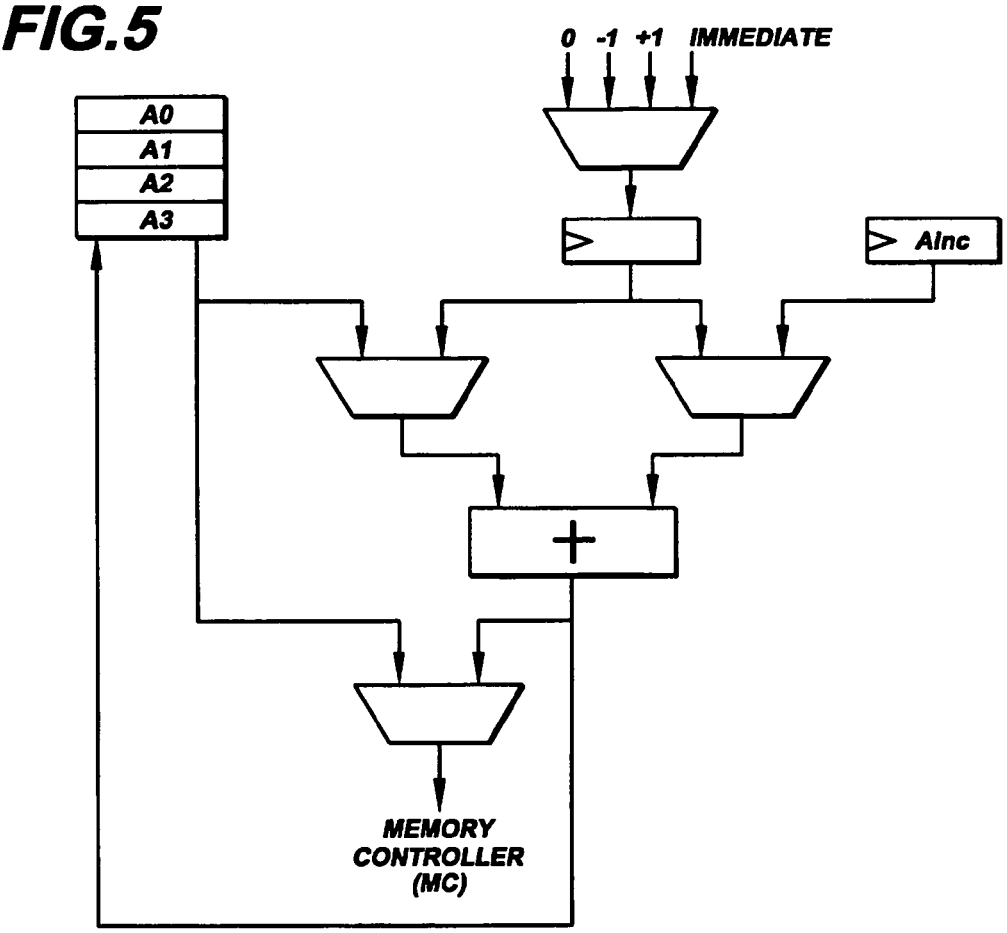
FIG. 5 shows an AGU unit, according to another example embodiment of the present invention.

FIG. 3 illustrates CPU components and pipeline, according to another example embodiment of the present invention. The 32-bit CPU implements a standard RISC 5-stage pipeline with two branch delay slots [1] and is complemented by two computational units that enhance the signal processing performance of the base architecture: a DSP Multiply Accumulate (DSPMAC) unit and an Address Generation Unit (AGU). The DSPMAC unit is illustrated in FIG. 4. The DSPMAC implements a single-cycle 32-bit×32-bit→64-bit multiplier for binary arithmetic. Input pre-processing supports two formatting options for each operand. In one implementation, a 32-bit operand is passed directly to the multiplier, and in another implementation, a 32-bit operand is created by selecting the upper or lower 16 bits of a source register, left justifying this signed data, and zero-padding the 16 least significant bits. The formatting options can be independently selected for each operand. Result post-processing on the register file writeback path supports a 1-bit left shift with saturation to trap the (−1*−1) arithmetic overflow in the case of (16-bit×16-bit) multiplies. The 32 most-significant bits are accumulated in one of two 40-bit registers. The AGU unit is shown in FIG. 5. The AGU supplies effective address calculation hardware that runs concurrently with the normal program flow address calculation of the CPU, and the AGU context is accessed through dedicated special-purpose registers. This architecture approach avoids multi-porting the general purpose register file to efficiently execute data movement-intensive operations associated with audio signal processing algorithms. The AGU provides sustained address pointer calculation every cycle and provides for simple machine restarts after exception processing.

In one example implementation, the DSPMAC and AGU units are used together in single instruction mnemonics. For instance, the CPU can execute a Multiply-Accumulate DSP32 instruction:

macdda rsrc1, rsrc2, rdest, acsrc, acdest, (ad)+ai that uses the DSPMAC unit to execute a full 32 bit multiply of the rsrc1 and rsrc2 registers producing a 64 bit result, accumulate the upper 32 bits of the result with the accumulation register specified by acsrc, and write the result to the accumulation register specified by acdest. The AGU unit in the same cycle accesses the memory location held in the specified ad register, stores the 32 bit quantity returned from this access into the rdest register, and increments the contents of the ad register by the increment amount ai. The increment amount can be 0, −1, +1 or the value of a special CPU register. Similar mnemonics encode the DSPMAC pre- and post-processing options listed above. Twenty-four of the seventy-six instruction mnemonics employ the use of the DSPMAC and/or the AGU units. The integration of the DSPMAC and AGU processing units with the CPU core allow CELP-based compression codecs to be implemented in C, with simple DSP functions coded as optimized assembly language loops. With this methodology, audio algorithms such as G.723.1 can be achieved in 30 CPU MIPS per channel and G.729A in 35 CPU MIPS per channel. With a 200 MHz Terminal Processor, four G.723 or G.729 channels with full communication and network stack support can be supported by a single device. Both of these codecs require 65 kBytes of text space, 20 kBytes of data space, and 5 kBytes per instance to track unique channel data. For a two channel telephony device, a total of (65+20+2*5)=95 kBytes of CPU memory space is required.

Figure 6:
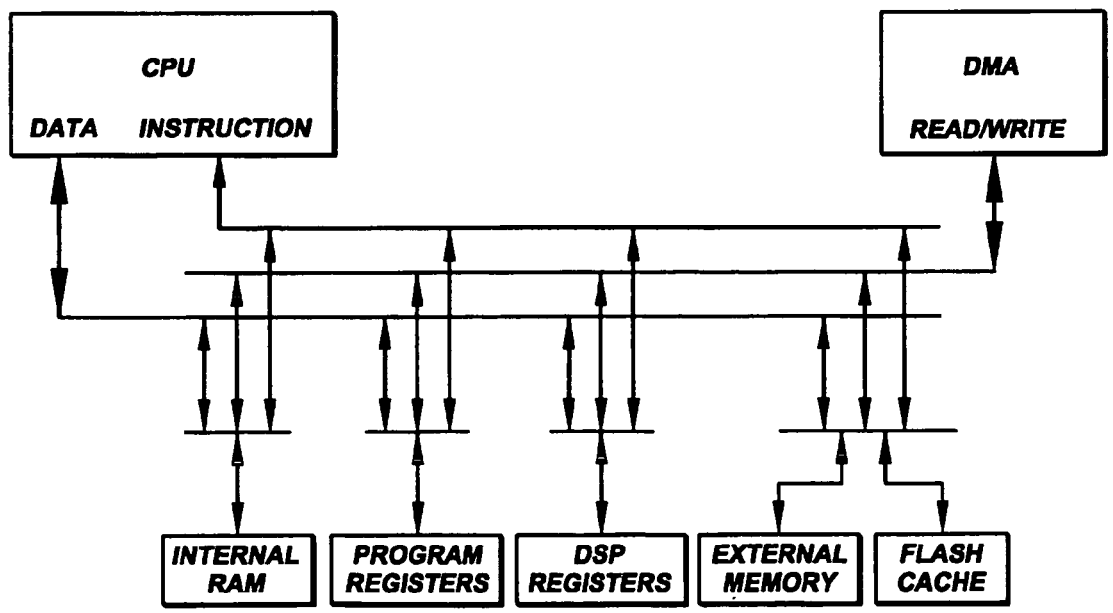
FIG. 6 shows a cross-point switch architecture, according to another example embodiment of the present invention.
Figures 9, 10:
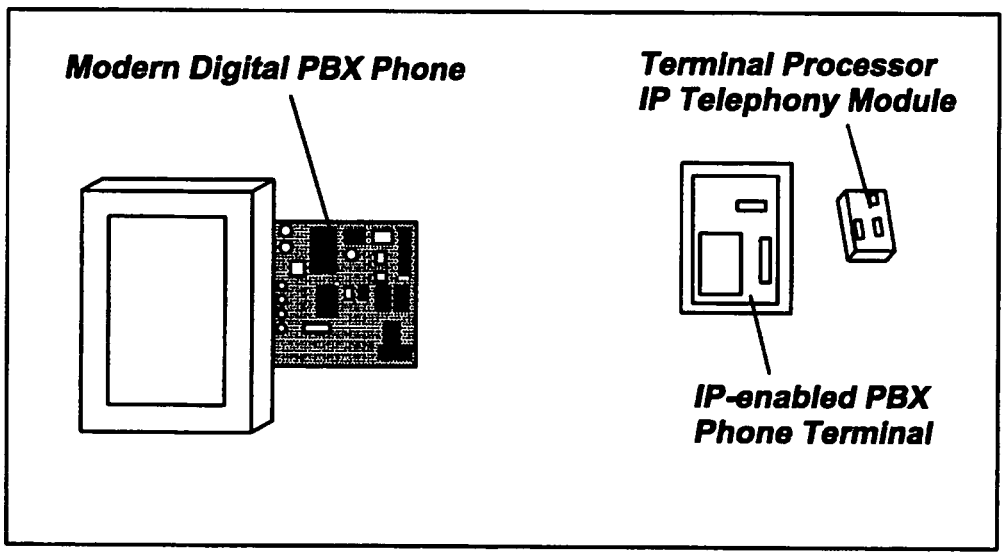
FIG. 9 is a summary and description of the 8×8 operating system which runs in conjunction with the Terminal Processor's embedded firmware, according to another example embodiment of the present invention.
FIG. 10 shows a depiction of a sample Terminal Processor reference design which illustrates the simplification in size, power, and cost over current PBX electronics solutions, according to another example embodiment of the present invention.
Figure 11:
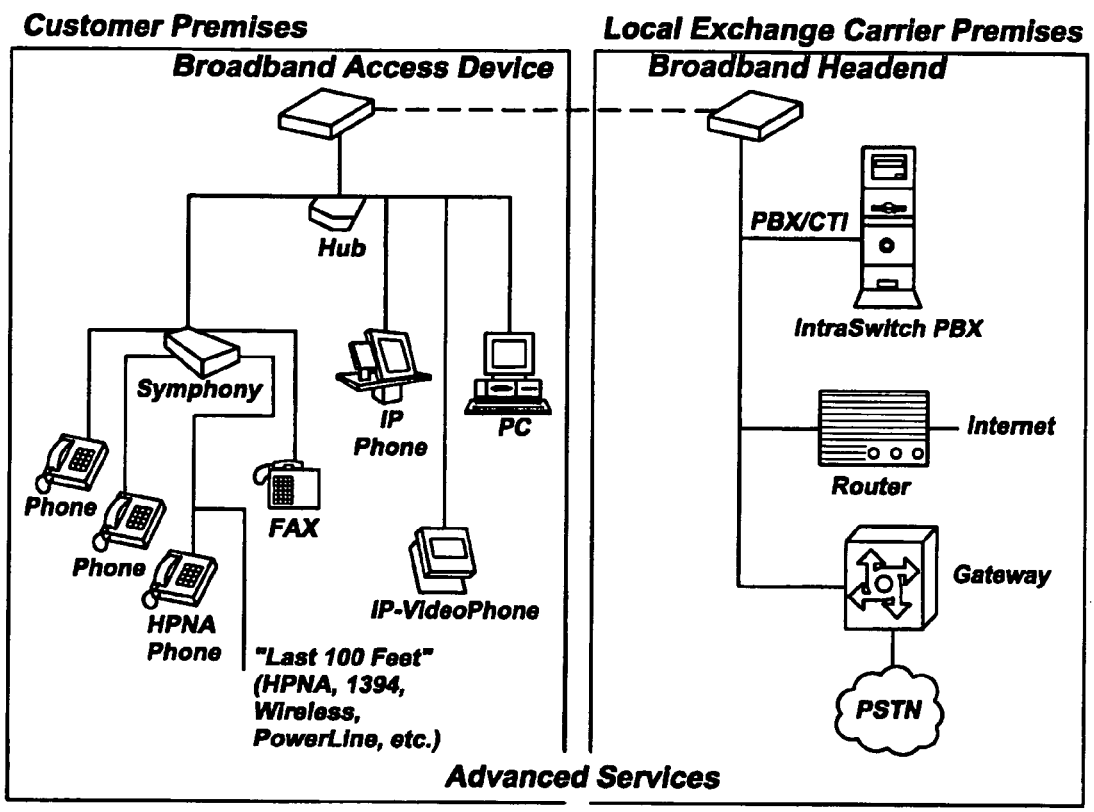
FIG. 11 is a sample Voice-over-IP telephony network topology. The Terminal Processor is contained in the IP Phone icon on the Customer Premises side of the network, according to another example embodiment of the present invention.
Figure 12:
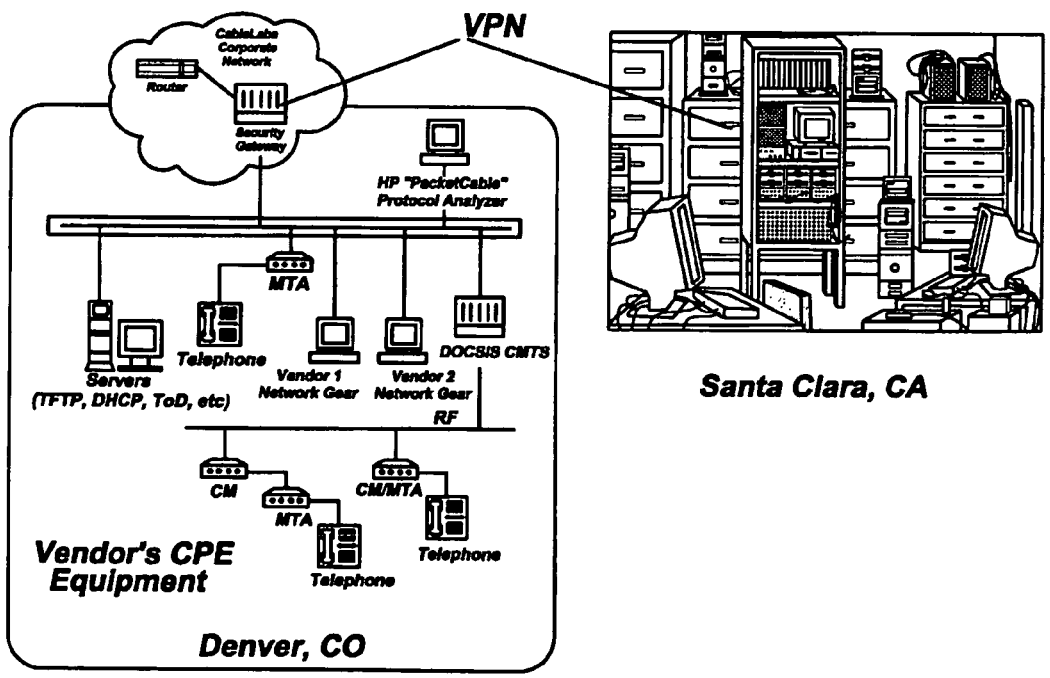
FIG. 12 shows a diagram of the 8×8/CableLabs Virtual Private Network which is used to test IP telephony chips, software, and systems in production environments, according to another example embodiment of the present invention.

The VoIP terminal processor contains sufficient on-chip RAM to run a connection-less thin client call stack such as the Multimedia Gateway Control Protocol (MGCP) and TCP/IP stack in addition to the audio compression protocols so that the processor requires no external system memory. IP telephony terminal devices typically contain Flash-style, non-volatile memory within the terminal system, and the terminal processor's 8 kByte FlashCache (FC) architecture enables the CPU to run communication stacks or applications that exceed the on-chip RAM capacity by caching out of the external Flash memory space. This space is configured as either 8- or 16-bit wide configurations supporting 4 chip selects, each individually programmable with several delay and wait-state characteristics. Access to these internal and external memory resources is managed by the Memory Controller (MC), which implements a cross-point switch architecture shown in FIG. 6. The MC is accessed only by the CPU and the DMA Engine. The 256 kbytes of on-chip RAM are 8-way interleaved at 32-bit word boundaries to minimize blocking accesses between DMA and CPU instruction and data fetch operations; arbitration of simultaneous contention gives the DMA Engine priority for one cycle and then returns access to the CPU. Since the majority of DMA operations alternate between a RAM access and a programming register access, this scheme results in minimal blocking within the crosspoint switch. The CPU is interfaced to the MC as a Harvard architecture device and behaves as such until the instruction and data fetch operations access the same memory resource on the switch; this condition results in a 2-cycle operation for that fetch.

The dual 10/100 Base-T MAC circuits are configured to operate as an ethernet switch with flow control algorithms administered by the CPU. In an IP telephone configuration, the ethernet connection passes through the terminal processor chip before connecting to other devices on the same physical connection (e.g. a personal computer in the same location as the IP phone). The flow control to and from the other devices is switched to maintain a favorable quality of service on the telephony connection. Both 10/100Base-T MAC circuits are interfaced to the DMA Engine which uses on-chip memory to buffer incoming and outgoing network streams. The MAC circuits contain a network management block of hardware counters which accelerate the collection of network transaction statistics used for RMON, SNMP and other network management protocols. These counters are interfaced to the CPU as memory-mapped programming registers.

To realize low power dissipation, the chip is fabricated in a 1.8V 0.18 μm CMOS process. The chip dissipates 250 mW at 200 MHz during normal operation. The die size is largely determined by the memory footprint (see FIG. 1), however no additional external static memory devices are required to build a telephony system. This characteristic is useful in reducing the power dissipation of the system to meet lifeline and primary line requirements of the overall IP telephony network. Power-down modes are included in the logic design, and the PLL multiplier value is programmed by the CPU so that the internal clock frequency can be slowed during periods of chip inactivity.

In another example embodiment of the present invention, the chip includes 256 Kbytes of on-chip RAM with zero wait state access via a crosspoint switch memory controller, enabling a thin-client telephony device to run within this memory space and not require any external memory. The chip is used in a telephony terminal system employing flash-style, non-volatile memory within the terminal system that includes embedded firmware for that device. A Flash-cache architecture is adapted to enable a CPU to boot and run code from an external Flash-style device, and mix this execution space with the on-board 256 Kbyte memory. The compute-intensive DSP code (audio codecs, acoustic echo cancellation, framing) is run out of internal RAM while the communication stacks (call setup/teardown, capabilities exchange and negotiation, etc.) are run out of external Flash.

In another particular example embodiment of the present invention, sample cache performance data for several H.323 test suites while running an application on the chip from external ROM yields a 95.5% hit rate for the FlashCache. In one particular application, the chip is operated out of on-chip RAM during 90% of the time and out of off-chip 16-bit wide 30-wait state Flash 10% of the time with a 95.5% hit rate in the FlashCache. In this application, average cycles per instruction of 0.9(1)+(1−0.9)(0.955(1)+(1−0.955)(30))=1.13 is realized. In this case, 13% of the application's MIPS budget is lost to cache misses, wherein 30 wait states are used with a 200 MHz processor with a 150 ns external Flash device. An external FlashCache port on the Terminal Processor supports three additional banks of memory-mapped device space that are not cached internally for interfacing the chip to external parallel I/O devices or memories.

In another example embodiment of the present invention, a Terminal Processor-based device is adapted to download embedded firmware from an external host or other network entity. An on-chip boot ROM containing a host monitor is provided on the terminal processor for the purpose of booting the CPU and running this monitor, thus enabling the capability to support a thin-client telephony system without any external memory devices, including Flash. This mode of operation is particularly useful when the Terminal Processor is used as a compression engine within a large parallel processing system serving many telephony ports (such as in an IP-telephony gateway or trunking gateway application). The terminal processor chip may, for example, be based on the 8×8 MIPS-X5 RISC processor. Measured MIPS ratings to date for various IP telephony software components achievable with this embodiment include:

| Application | MIPS |
| --- | --- |
| G.723.1 codec (per channel) | 30 |
| G.729.A codec (per channel) | 35 |
| G.729.E (per channel) | 70 |
| TCP/IP stack (idle) | 0.15 |
| TCP/IP stack (responding to ARP) | 1.5 |
| TCP/IP stack (2 Mbps data exchange) | 5.5 |

While the present invention has been described with reference to several particular example embodiments, those skilled in the art will recognize that many changes may be made thereto without departing from the spirit and scope of the present invention, which is set forth in the following claims.

What is claimed is:

1. A programmable audio processor chip for processing voice data comprising:
    a DSP voice compression device adapted to compress the voice data;
    audio processing circuitry programmed with an audio processing software application for processing the compressed voice data;
    an IP network stack adapted to store and process IP data, the IP network stack including protocols for processing the compressed voice data via an IP network; and
    a communication stack adapted to store and process communications data, the communications stack including audio processing protocols for processing the compressed voice data.

2. The programmable audio processor chip of claim 1, wherein the programmable audio processor chip is further adapted to convert the voice data between IP audio data and digital audio data.

3. The programmable audio processor chip of claim 1, further comprising an analog-digital (A/D) converter adapted to convert the voice data between analog and digital form.

4. The programmable audio processor chip of claim 3, wherein the A/D converter is adapted to convert a voice signal captured at a microphone of a telephony device employing the programmable audio processor chip.

5. The programmable audio processor chip of claim 3, further comprising a telephony device that houses the programmable audio processor chip, wherein the A/D converter is adapted to convert digital data into analog form for use at a speaker of the telephony device.

6. The programmable audio processor chip of claim 1, wherein the IP network stack includes at least one of: a TCP/IP stack and a H.323 stack.

7. The programmable audio processor chip of claim 1, wherein the communication stack is adapted to provide at least one of the following protocols: call setup, call tear down, capabilities exchange and negotiation.

8. The programmable audio processor chip of claim 1, further comprising sufficient on-chip RAM to run a connection-less thin client call stack, a TCP/IP stack and audio compression protocols, wherein the programmable audio processor chip is adapted to function without external system memory.

9. The programmable audio processor chip of claim 1, wherein the programmable audio processor chip is adapted to dissipate 250 mW at 200 MHz.

10. The programmable audio processor chip of claim 1, wherein the audio processing circuitry is programmed with a power-down mode, wherein the internal clock frequency is slowed during periods of chip inactivity.

11. The programmable audio processor chip of claim 1, wherein the audio processing circuitry is adapted to be programmed using C programming language.

12. The programmable audio processor chip of claim 1, wherein the audio processing circuitry further comprises Flash-cache architecture adapted to enable a CPU to boot and run code from an external Flash-style device, and mix this execution space with memory on the chip.

13. A telephony communications device adapted to communicate data including voice data, the device comprising:
    a programmable audio processor chip having both microcontroller and DSP functions and adapted to perform Internet protocol/digital (IP/D) conversions for IP voice data and digital voice data, wherein the programmable audio processor chip includes an IP network stack and a communications stack;
    an audio capture device communicatively linked to the programmable audio processor chip and adapted to capture a voice signal and communicate the captured voice signal to the programmable audio processor chip; and
    an audio speaker communicatively linked to the programmable audio processor chip and adapted to generate sound in response to a signal communicated from the programmable audio processor chip.

14. The telephony communications device of claim 13, wherein the programmable audio chip comprises:
    a DSP voice compression device adapted to compress the voice data;
    audio processing circuitry programmed with an audio processing software application for processing the compressed voice data;
    the IP network stack adapted to store and process IP data, the IP network stack including protocols for processing the compressed voice data via an IP network; and
    the communication stack adapted to store and process communications data, the communications stack including audio processing protocols for processing the compressed voice data.

15. The telephony communications device of claim 13, wherein the telephony communications device further comprises flash-style, non-volatile memory that includes embedded firmware for that device, and wherein the programmable audio processor chip includes a flash-cache architecture adapted to enable a CPU to boot and run code from the Flash-style, non-volatile memory and mix this execution space with internal memory on the programmable audio processor chip.

16. The telephony communications device of claim 15, further comprising a plurality of communications stacks, wherein the device is adapted to run compute-intensive DSP code out of the internal memory and to run the communication stacks out of the flash-style, non-volatile memory.

17. The telephony communications device of claim 16, wherein the device is adapted to run the compute-intensive DSP code including at least one of: audio codecs, acoustic echo cancellation and framing.

18. The telephony communications device of claim 16, wherein the communication stacks are adapted to process data for executing at least one of: call setup, call teardown, capabilities exchange and negotiation.

19. An IP telephony communications network comprising:
   a plurality of IP telephony devices each having a programmable audio processor chip comprising:
      a DSP voice compression device adapted to compress the voice data;
      audio processing circuitry programmed with an audio processing software application for processing the compressed voice data;
      an IP network stack adapted to store and process IP data, the IP network stack including protocols for processing the compressed voice data via an IP network; and
      a communication stack adapted to store and process communications data, the communications stack including audio processing protocols for processing the compressed voice data;
   a CPU adapted to communicate with the plurality of IP telephony communications devices and to program the programmable audio processor chip in each IP telephony device, the programming including communications protocols, the CPU having a standard RISC 5-stage pipeline adapted to execute a plurality of instructions simultaneously; and
   a communications link coupled to each of the IP telephony devices and to the CPU and adapted to transmit communications data including voice IP data.

20. The network of claim 19, wherein the CPU further comprises a DSP Multiply Accumulate (DSPMAC) unit and an Address Generation Unit (AGU).

21. The network of claim 20, wherein the AGU is adapted to effect address calculation concurrently with normal program flow address calculation of the CPU.

22. An IP telephony communications network comprising:
   a plurality of IP telephony devices each having a programmable audio processor chip comprising:
      a DSP voice compression device adapted to compress the voice data;
      audio processing circuitry programmed with an audio processing software application for processing the compressed voice data;
      an IP network stack adapted to store and process IP data, the IP data including protocols for processing the compressed voice data via an IP network; and
      a communication stack adapted to store and process communications data, the communications data including audio processing protocols for processing the compressed voice data;
   a CPU adapted to communicate with the plurality of IP telephony communications devices and to program the programmable audio processor chip in each IP telephony device, the programming including communications protocols, the CPU having a standard RISC 5-stage pipeline adapted to execute a plurality of instructions simultaneously, a DSP Multiply Accumulate (DSPMAC) unit and an Address Generation Unit (AGU), the AGU adapted to effect address calculation concurrently with normal program flow address calculation of the CPU, the DSPMAC and AGU being adapted to be used together in single instruction mnemonics; and
   a communications link coupled to each of the IP telephony devices and to the CPU and adapted to transmit communications data including voice IP data.

23. The programmable audio processor chip of claim 1, wherein the IP network stack includes at least one of: a TCP/IP stack and an IP telephony stack.

24. A programmable audio processor chip for processing telephony voice data comprising:
   a DSP voice compression and decompression device adapted to compress and decompress the telephony voice data;
   a programmable processing layer programmed with an audio processing application for processing the compressed telephony voice data;
   an IP network stack adapted to store and process IP telephony data, the IP network stack including protocols for processing the compressed telephony voice data via an IP network; and
   a communication stack adapted to store and process communications data, the communications stack including audio processing protocols for processing the compressed voice data.

25. The programmable audio processor chip of claim 24, further comprising an application layer programmed using C programming language.

26. The programmable audio processor chip of claim 25, wherein the application layer is adapted for programming with assembly language.

27. The programmable audio processor chip of claim 24, wherein the DSP voice compression and decompression device is an executable function on the programmable audio processor chip coded as assembly language.

* * * * *